US006311573B1

(12) United States Patent
Bhardwaj

(10) Patent No.: US 6,311,573 B1
(45) Date of Patent: Nov. 6, 2001

(54) ULTRASONIC TRANSDUCER FOR HIGH TRANSDUCTION IN GASES AND METHOD FOR NON-CONTACT ULTRASOUND TRANSMISSION INTO SOLID MATERIALS

(76) Inventor: Mahesh C. Bhardwaj, 1020 E. Boal Ave., Boalsburg, PA (US) 16827

( * ) Notice: Subject to any disclaimer, the term of this patent is extended or adjusted under 35 U.S.C. 154(b) by 0 days.

(21) Appl. No.: 09/446,058

(22) PCT Filed: Jun. 17, 1998

(86) PCT No.: PCT/US98/12537

§ 371 Date: Dec. 16, 1999

§ 102(e) Date: Dec. 16, 1999

(87) PCT Pub. No.: WO98/58519

PCT Pub. Date: Dec. 23, 1998

Related U.S. Application Data

(60) Provisional application No. 60/056,611, filed on Aug. 20, 1997, and provisional application No. 60/050,217, filed on Jun. 19, 1997.

(51) Int. Cl.[7] ........................................ G01D 21/00

(52) U.S. Cl. ........................................ 73/866.5

(58) Field of Search ........................ 73/866.5, 632, 73/641; 310/8.1, 8.2, 8.3, 322

(56) References Cited

U.S. PATENT DOCUMENTS 4,122,725 * 10/1978 Thompson ........................ 73/632
4,197,920 * 4/1980 Cluzel et al. ........................ 181/175
5,159,838 * 11/1992 Lynnworth ........................ 73/644

* cited by examiner

*Primary Examiner*—Benjamin R. Fuller
*Assistant Examiner*—Jewel V. Thompson
(74) *Attorney, Agent, or Firm*—Webb Ziesenheim Logsdon Orkin & Hanson, P.C.

(57) ABSTRACT

An ultrasonic transducer for transmitting and receiving ultrasonic energy to and from a gaseous medium comprises a piezoelectric element having front and back sides, an electrically conductive plating over the front side of the piezoelectric element, a transmission layer of lower acoustic impedance materials abutting the plating, a facing layer of a fibrous material bonded to the transmission layer without substantial penetration of the bonding agent and electrical connections for applying an exciting electrical signal to the piezoelectric element.

6 Claims, 4 Drawing Sheets

ULTRASONIC TRANSDUCER FOR HIGH TRANSDUCTION IN GASES AND METHOD FOR NON-CONTACT ULTRASOUND TRANSMISSION INTO SOLID MATERIALS

This application is a 371 of PCT/US98/12537 filed Jun. 17, 1998 and claims benefit to Provisional Application No. 60/056,611 filed Aug. 20, 1997; which claims benefit to No. 60/050,217 filed Jun. 19, 1997.

BACKGROUND OF THE INVENTION

It is highly desirable to transmit ultrasonic energy into gases to be able to analyze the gases for their composition, flow and other properties and to conduct remote and level sensing of objects through air. It is also highly desirable to transmit ultrasonic energy into air to perform non-contact testing upon products, such as paper, wood, low acoustic impedance green ceramics and powder metals, plastics and composites as well as high acoustic impedance ceramics, metals, etc. In medical applications, it is also highly desirable to conduct non-contact diagnostics of skin and other parts of the body of humans or animals, fetus monitoring, blood flow measurements, and for non-contact and non-invasive therapeutical and surgical applications, such as for malignant skin removal, lipotirpsy, unwanted mole removal, etc. It is also highly desirable in agricultural applications, such as for plant and tree diagnostics, as well as for fruit, vegetable and seed analysis.

It is well understood that the acoustic impedance of gases is several orders of magnitude from the acoustic impedance of typical piezoelectric materials. Also, the larger the difference in acoustic impedance of two adjacent layers, the more difficult it is to transmit ultrasonic energy across the boundary between the two layers. Finally, it is known that gases rapidly absorb ultrasonic energy especially as the frequency of the ultrasound is increased.

It has been possible with a certain degree of success to transmit ultrasound into gases, such as air, by placing a low impedance material in front of the piezoelectric element. The transmission of ultrasound into gases has nevertheless been far less than desired.

It is an advantage, according to this invention, to provide a greatly improved ultrasonic transducer and method of using same which transmits ultrasonic energy into gases with much greater efficiency.

SUMMARY OF THE INVENTION

Briefly, according to this invention, there is provided an ultrasonic transducer for transmitting and receiving ultrasonic energy to and from a gaseous medium. The transducer comprises a piezoelectric element comprising a ceramic/piezoelectric material, an electrically conductive plating over the front and back sides of the piezoelectric element, a transmission layer of low acoustic impedance material adjacent the electrically conductive plating on the front side of the piezoelectric element, electrical connections for applying an exciting electrical signal to the piezoelectric element and a facing layer of fibers attached to the surface of the transmission layer. Preferably, the acoustic impedance of the transmission layer is between about $1\times10^6$ kg/m$^2$·s and $20\times10^6$ kg/m$^2$·s, the acoustic impedance of the piezoelectric material is between about $2\times10^6$ kg/m$^2$·s and $50\times10^6$ kg/m$^2$·s. According to one embodiment, the facing layer comprises a fibrous material, such as a mat, paper, felt or fabric that is bonded to the transmission layer without substantial penetration of the bonding agent into the fibrous material.

According to a preferred embodiment, the fibrous facing layer is comprised of fibers the substantial portion of which are oblique or perpendicular to the front face of the piezoelectric element.

Briefly, according to this invention, there is provided a method for transmitting sound and ultrasound through a gaseous medium into and out of a solid specimen comprising the steps of bonding a facing layer of a fibrous material to the transmission surface of a transducer for converting one form of energy to vibrations, for example, a piezoelectric transducer, without substantial penetration of the bonding agent into the fibrous material; bonding a facing layer of a fibrous material to a surface of the solid specimen without substantial penetration of the bonding agent into the fibrous material; and exciting the transducer directed at the surface of the solid specimen with the facing layer bonded thereto.

There is also provided a method for transmitting ultrasound through a gaseous medium into and through a solid specimen comprising the steps of bonding a facing layer of a fibrous material to the transmission surface of first and second transducers without substantial penetration of the bonding agent into the fibrous material; bonding a facing layer of a fibrous material to opposite surfaces of the solid specimen without substantial penetration of the bonding agent into the fibrous material; and exciting the first transducer directed at the surface of the solid specimen with the facing layer bonded thereto and detecting the ultrasound transmitted through the solid specimen with the second transducer.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
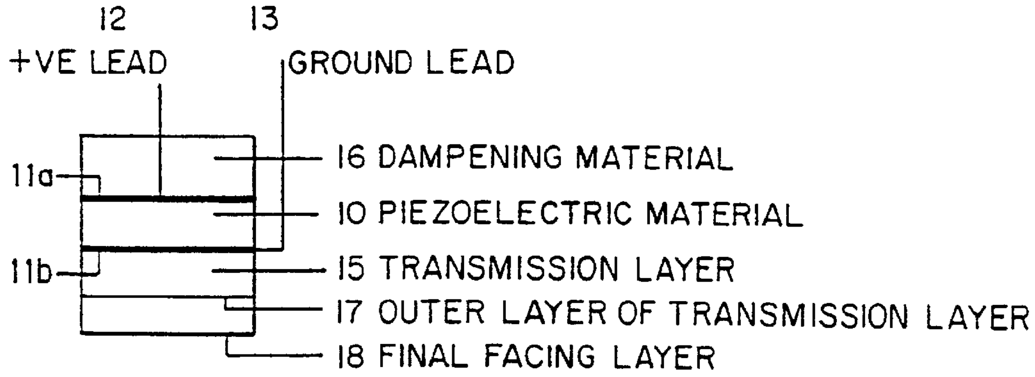
FIG. 1 is a schematic section view through a transducer according to this invention.

Referring to FIG. 1, there is shown a transducer according to this invention that is especially suitable for transmitting ultrasonic energy into a gas. The piezoelectric element 10 has conductive layers or plating 11*a* and 11*b* over the front and back faces thereof. Electrical leads 12, 13 are connected to the rear face of the piezoelectric crystal and to the conductive layer over the front face. When an appropriate pulse signal is applied to the piezoelectric element via the leads, the element vibrates at a frequency characterized by the dimensions of the element.

According to this invention, suitable material for the piezoelectric ceramic comprises lead zirconate/lead titanate solid solutions (PZT), lead meta-niobate, lithium niobate and other suitable electromechanical coupling agents.

The conductive layers or plating 11*a* and 11*b* on the front and back faces may comprise metals such as gold, silver, platinum, nickel or conductive epoxy materials that are filled with powdered metals. Typically, these conductive layers are less than 20 microns thick.

Referring again to FIG. 1, the electrically conductive layer 11*b* abuts the inner face of a transmission layer 15. The electrically conductive layer 11*a* is either bonded to low or high impedance dampening material 16, depending upon the required dampening of the piezoelectric element 10. Alternatively, if desired, the conductive layer 11*a* can also be left in air, that is, without bonding it to any other material. The entire assembly can be encapsulated in a suitable housing for its ergonomic use. The transmission layer 15 comprises polymers and polymers filled with ceramic or glass particulates and fibers or light metals or ceramics or glasses. Abutting and bonded to the outer face 17 of the transmission layer 15 is a facing layer 18 of very low acoustic impedance material. The facing layer is a fibrous material such as a mat, paper, felt or fabric that is bonded to the transmission layer 15 without substantial penetration of the bonding agent into the fibrous material. The fibers themselves may be textile fibers, either natural or synthetic, paper fibers, carbon polymer fibers or ceramic fibers. The fibers must form an interconnecting matrix as with a weave or felt. The fibers adjacent to the transmission layer 15 must be bonded to the transmission layer but care must be taken to minimize the penetration of bonding material into the fiber matrix as this will destroy the desired acoustic properties of the fiber layer.

The acoustic impedance of the piezoelectric element 10 is between about $2\times10^6$ kg/m$^2$·s and $50\times10^6$ kg/m$^2$·s. The acoustic impedance of the transmission layer 15 is between about $1\times10^6$ kg/m$^2$·s and $20\times10^6$ kg/m$^2$·s and the acoustic impedance of the facing layer 18 is less than about $1\times10^6$ kg/m$^2$·s. Gradually, the acoustic impedance is lowered moving from the transducer to the air or gas into which the ultrasonic signal is transmitted by the selection and use of an especially selected transmission layer and a fibrous material facing layer.

The combined thickness of the front electrically conductive transmission and facing layers should correspond to the wavelength divided by four for maximum energy transmission into gas or air. Since all layers are very thin, the transmission layer will normally be very close to the thickness of the wavelength divided by four.

The advantages of this invention are clear from the following comparative testing illustrating the transduction into gases by transmission mode experiments. In the reflection mode experiments, the same transducer is used for both sending and receiving an ultrasonic pulse whereas in the transmission mode experiments, separate transducers are used to send and receive an ultrasonic pulse.

According to a preferred embodiment, the transmission layer 15 may comprise two or more layers.

The first transmission layer is preferably one which is transparent to the resonant frequency of the piezoelectric material and the acoustic impedance, $Z_2$, of which is approximately (preferably lower than)

$$=[Z_1^2+Z_a^2)/2]^{1/2}$$

where $Z_1$ is the acoustic impedance of the piezoelectric element and $Z_a$ that of air. Since $Z_a$ is extremely low compared to $Z_1$ (and of other solids), it can be deleted from the equation. Therefore, $$Z_2=[Z_1^2/2]^{1/2}$$

Such materials are: aluminum, ordinary glasses, ceramics and their composites.

The second transmission layer is preferably one which is transparent to the resonant frequency of the piezoelectric element and the acoustic impedance, $Z_3$, of which is approximately (preferably lower than)

$$=[Z_2^2/2]^{1/2}$$

Such materials are: epoxies, rubbers, other plastics, etc.

The fiber matrix facing layer is preferably the one which is also transparent to the resonant frequency of the piezoelectric element and the acoustic impedance, $Z_4$, of which is approximately (preferably lower)

$$=[Z_3^2/2]^{1/2}$$

Such materials are those characterized by open porosity, and for extremely high transduction in air or gaseous media, they should also be composed of fibrous structures, such as, papers, cloths, ceramic, wood, lumber, plant stems, branches or leaves, glass, graphite, metal or polymer fiber papers, tapes, etc.

It is imperative that the final transmission layer be acoustically transparent when examined in the non-contact (gas contact) mode at the resonant frequency of the transducer. It has been found that fiber-based materials, characterized by high porosity, are the best materials for this application. With ordinary papers, it has been further found that clay-coated papers are more practical.

EXAMPLE 1

A 1 MHz transducer may be constructed as follows:

Piezoelectric material: PZT.$Z_1=34\times10^6$ kg/m$^2$·s.

First transmission layer: aluminum. V=6325 m/s. $Z_2=17\times10^6$ kg/m$^2$·s.

P/8 @ 1 MHz=1000/8=125 ns, where 1000 ns is one period, P, for the MHz frequency.

Therefore, thickness of this layer is $125\times10^{-9}\times6{,}325{,}000=0.79$ mm.

Second transmission layer: hard epoxy. V=2600 m/s. $Z_3=3\times10^6$ kg/m$^2$·s.

P/16 @ 1 MHz=1000/16=62.5 ns.

Therefore, thickness of this layer is $62.5\times10^{-9}\times2{,}600{,}000=0.16$ mm.

Facing layer: clay-coated paper. V=500 m/s. $Z_4=0.6\times10^6$ kg/m$^2$·s.

P/16 @ 1 MHz=1000/16=62.5 ns.

Therefore, thickness of this layer is $62.5\times10^{-9}\times500{,}000=0.03$ mm.

All transmission layers can be bonded to each other with conventional epoxies and cements, however, the final porous fibrous layer must be bonded in such a way that the porosity of its structure is not altered. Therefore, self-adhesive tape or other high viscosity epoxy, glue or cement is desirable.

Such a device (with variable thicknesses of transmission layers) has been made and it is at least five times better in terms of output and sensitivity when compared to similar devices made according to any prior art methods of which I am aware.

EXAMPLE 2

A transducer according to this invention with a multi-part transmission layer might be constructed of the following layers:

| | |
|---|---|
| piezoelectric layer (PZT) | $34 \times 10^6$ kg/m$^2$ · s |
| aluminum layer | $17 \times 10^6$ kg/m$^2$ · s |
| aluminum composite layer | $7 \times 10^6$ kg/m$^2$ · s |
| epoxy layer | $3 \times 10^6$ kg/m$^2$ · s |
| paper facing layer | $0.3 \times 10^6$ kg/m$^2$ · s. |

The interlayer transmission coefficients would then be 0.89, 0.83, 0.84, 0.33. The transmission coefficient between the paper facing and air would be 0.005.

EXAMPLE 3

A transducer according to this invention with a multi-part transmission layer might be constructed of the following layers:

| | |
|---|---|
| piezoelectric layer (PZT) | $34 \times 10^6$ kg/m$^2$ · s |
| aluminum layer | $17 \times 10^6$ kg/m$^2$ · s |
| aluminum composite layer | $7 \times 10^6$ kg/m$^2$ · s |
| epoxy layer | $3 \times 10^6$ kg/m$^2$ · s |
| high density paper layer | $1 \times 10^6$ kg/m$^2$ · s |
| paper facing layer | $0.3 \times 10^6$ kg/m$^2$ · s. |

The interlayer transmission coefficients would be 0.89, 0.83, 0.84, 1.0, 0.7. The transmission coefficient between the paper facing and air would be 0.005.

In Examples 2 and 3, the transmission coefficients were calculated according to the formula $4Z_1 Z_2/(Z_1+Z_2)^{1/2}$, where $Z_1$ is the acoustic impedance of the transmission layer from which ultrasound is transmitted and $Z_2$ is the acoustic impedance of the transmission layer into which ultrasound is transmitted. The aim is to increase the sound reaching the paper layer as strongly as possible because even according to this invention, the transmission into air is difficult.

Set forth in the following table are data for received sensitivities of non-contact transducers in ambient air in transmission modes for the best prior art transducers and transducers according to this invention having a fibrous material facing layer. (Sensitivity (dB)=20 Log $V_x/V_o$, where $V_x$=the voltage (amplitude) of the received signal and $V_o$ the excitation voltage (amplitude) of the exciting signal.) These tests were conducted by first testing the prior art transducers without a paper facing layer followed by testing with the paper facing layer on both the sending and receiving transducers.

Received Sensitivities of Non-Contact Transducers in Ambient Air in Transmission Modes Air Separation Distance: 10 MM

| FREQUENCY | ACTIVE AREA DIA. (mm) | COMPARATIVE DATA | THIS INVENTION |
|---|---|---|---|
| 250 KHz | 51.0 | −54 dB | −42 dB |
| 500 KHz | 51.0 | | −48 dB |
| 750 KHz | 51.0 | −60 dB | −50 dB |
| 1.0 MHz | 25.0 | −62 dB | −48 dB |
| 2.0 MHz | 25.0 | −70 dB | −60 dB |
| 5.0 MHz | 19.0 | | −74 dB |

In the above-described examples, the orientation of the fibers in the fibrous layer was for the most part parallel to the surface of the piezoelectric transducer. It has been found that transduction can be further improved by orienting the fibers in the facing layer oblique or perpendicular to the plane of the transducer. Based on certain analogous experiments, the improvement in sensitivity by orienting the fibers oblique or perpendicular to the plane of the transducer will be on the order of 22 dB or 10 times. One example of a facing layer with fibers oriented perpendicular to the plane of the transducer is a layer of wood cut perpendicular to the grain. Other plant material might be used.

Figure 2:
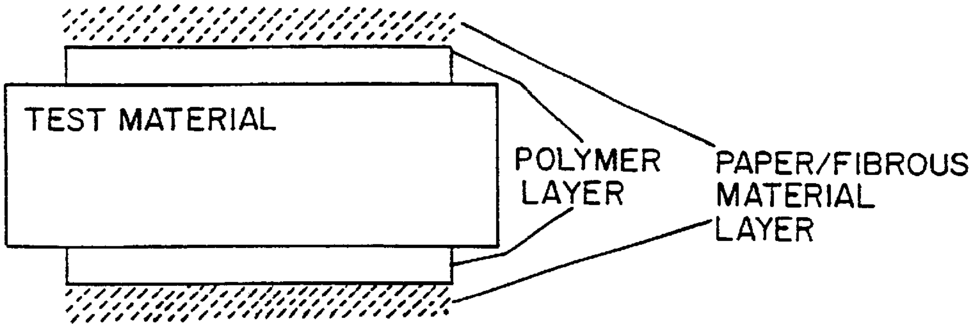
FIG. 2 illustrates a solid specimen prepared to receive ultrasound in a non-contact mode.

Referring now to FIG. 2, there is shown schematically a specimen prepared for receiving ultrasound transmitted thereinto through a gaseous medium. A thin polymer layer is bonded directly to opposite surfaces of the specimen and a fibrous layer is bonded over the polymer layer. It is desired that the layers be very thin, say, on the order of tens of micrometers. In the case of specimens that are already comprised of low transmissivity materials, such as polymers and polymer-based materials (characterized by low acoustic impedance), only the fibrous layer is required. On the other hand, in order to increase the transmissivity in materials, such as metals, dense ceramics, and their composites (characterized by extremely high acoustic impedance), a thin layer of polymer (rubber, epoxy, polyester, etc.) between the specimen and the fibrous layer is desirable.

The fibrous material or layer may be a mat, felt, paper or fabric. The fibers themselves may be textile fibers and ceramic fibers. The fibers must form an interconnecting matrix as with a weave or felt. The fibers adjacent to the specimen must be bonded to the specimen or an intermediate polymer layer but care must be taken to minimize the penetration of bonding material into the fiber matrix as this will destroy the desired acoustic properties of the fiber layer.

The ultrasound transducers for generating and receiving ultrasound are described above. Other sound and ultrasound transducers in addition to piezoelectric transducers, such as magnetic, electrostrictive and capacitance transducers, will have increased ability to transmit vibrations into the surrounding atmosphere when provided with the therein and herein described fibrous coating.

FIGS. 3 to 6 show comparative traces captured and displayed by a digital oscilloscope. In every case, the vertical scales for both traces are identical and are given in mV per division at the lower left of the display. The horizontal scales for both traces are not identical. The lower traces have been expanded to better show the significant features of the waveform. The extent to which the lower trace was expanded is apparent from the numbers given in μs per division below the display. For example, with reference to FIG. 3, the numbers M 10 μs and D 1 μs indicate the lower trace was expanded 10 to 1.

Figure 3:
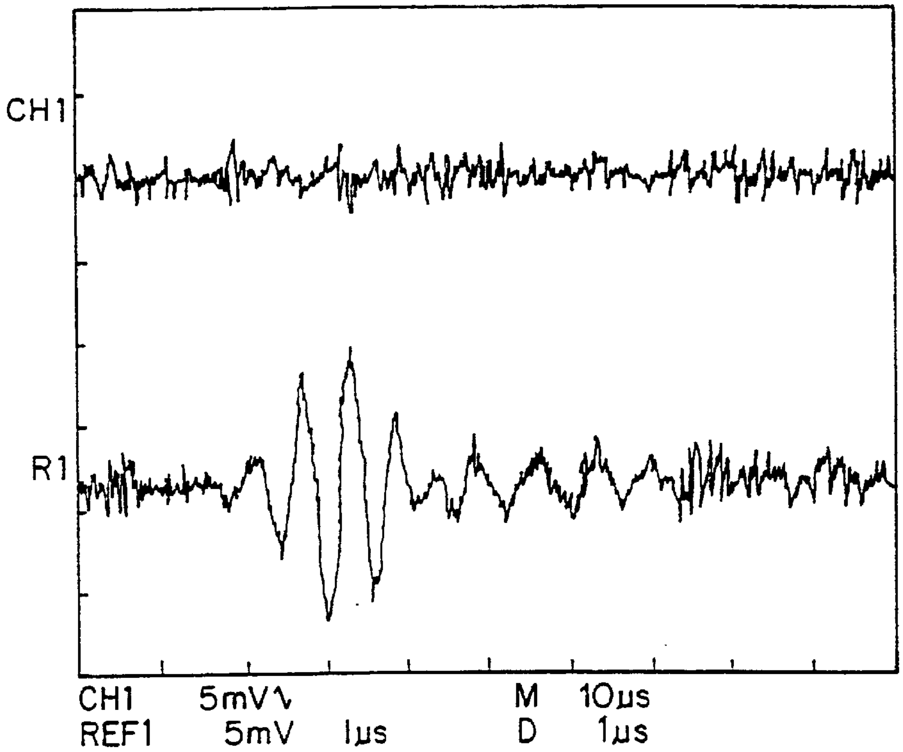
FIG. 3 is an oscilloscope trace demonstrating the effectiveness of the method according to this invention for transmitting ultrasound through graphite fiber reinforced plastic composites.

Referring to FIG. 3, the top trace illustrates the signal received through a naked specimen and the bottom trace the signal received through a specimen that has been covered with the polymer and fibrous layers. The specimen was graphite fiber reinforced plastic composite 3 mm thick ($Z=8\times10^6$ kg/m$^2$·s).

The transducer generating the 2 MHz ultrasound was excited with a 16 volt sine wave. The amplification of the received signal was 72 dB. The signal transmitted through the uncovered specimen can barely be detected through the background noise whereas the signal transmitted through the covered specimen is definitive.

Figure 4:
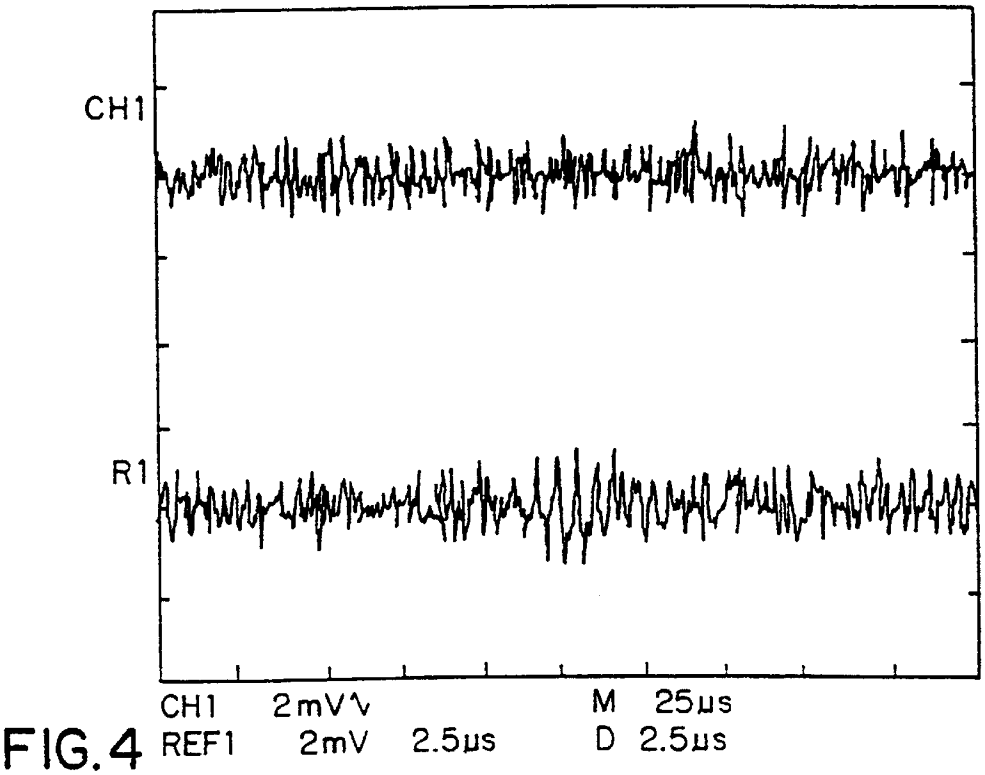
FIG. 4 is an oscilloscope trace demonstrating the effectiveness of the method according to this invention for transmitting ultrasound through dense sintered alumina.

Referring to FIG. 4, the top trace illustrates the signal received through a naked specimen and the bottom trace the signal received through a specimen that has been covered with the polymer and fibrous layers. The specimen was dense 99.3 sintered alumina 10.2 mm thick ($Z=44\times10^6$ kg/m$^2$·s). The transducer generating the 2 MHz ultrasound was excited with a 16 volt sine wave. The amplification of the received signal was 72 dB. The signal transmitted through the uncovered specimen can barely be detected through the background noise whereas the signal transmitted through the covered specimen is observable.

Figure 5:
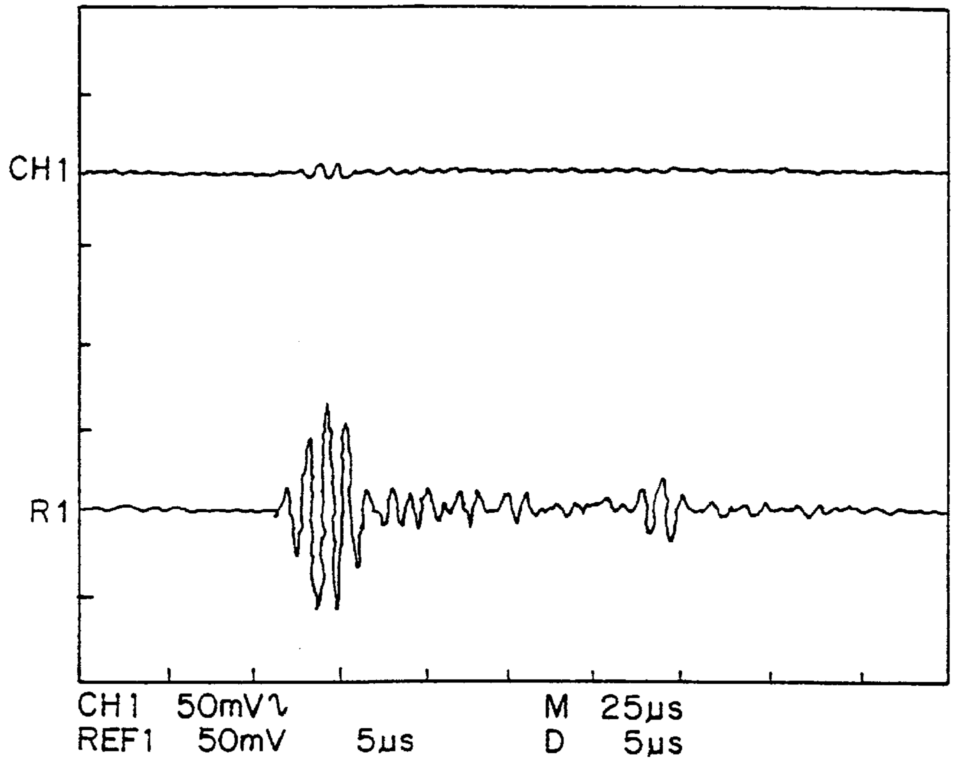
FIG. 5 is an oscilloscope trace demonstrating the effectiveness of the method according to this invention for transmitting ultrasound through an aluminum block.

Referring to FIG. 5, the top trace illustrates the signal received through a naked specimen and the bottom trace the signal received through a specimen that has been covered with the polymer and fibrous layers. The specimen was an aluminum block 51 mm thick ($Z=17\times10^6$ kg/m$^2$·s). The transducer generating the 1 MHz ultrasound was excited with a 16 volt sine wave. The amplification of the received signal was 72 dB. The signal transmitted through the uncovered specimen is shown in the upper left quadrant but an internally reflected and transmitted signal can barely, if at all, be detected through the background noise. The transmitted and reflected signals in the coated specimen are definitive.

Figure 6:
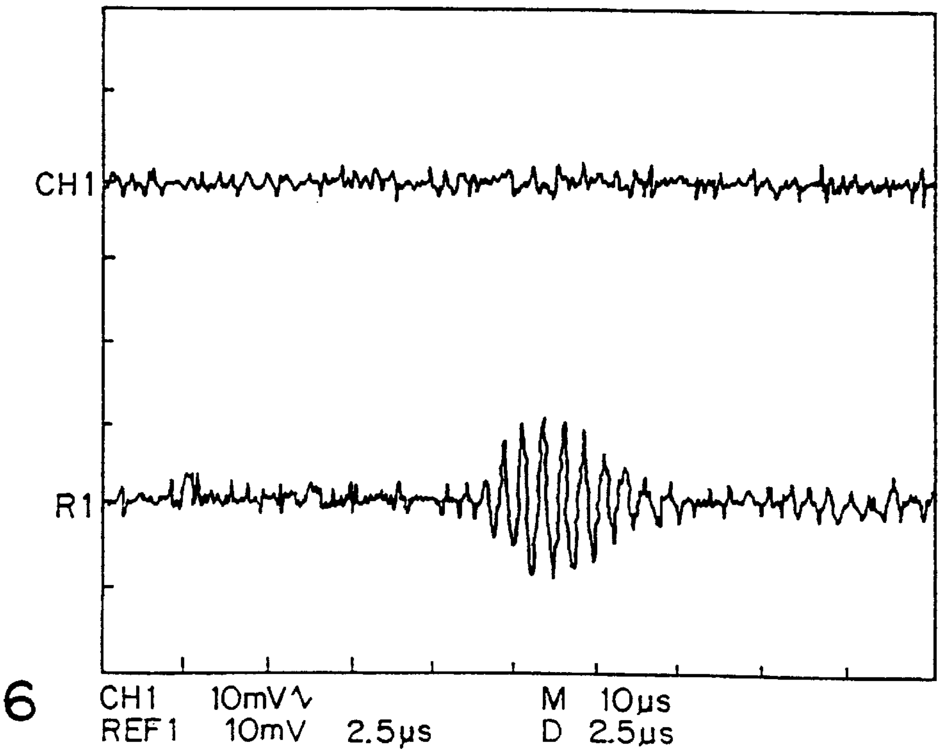
FIG. 6 is an oscilloscope trace demonstrating the effectiveness of the method according to this invention for transmitting ultrasound through a titanium alloy.

Referring to FIG. 6, the top trace illustrates the signal received through a naked specimen and the bottom trace the signal received through a specimen that has been covered with the polymer and fibrous layers. The specimen was high strength aircraft titanium-nickel alloy 12.7 mm thick ($Z=50\times10^6$ kg/m$^2$·s). The transducer generating the 2 MHz ultrasound was excited with a 16 volt sine wave. The amplification of the received signal was 72 dB.

Figure 7:
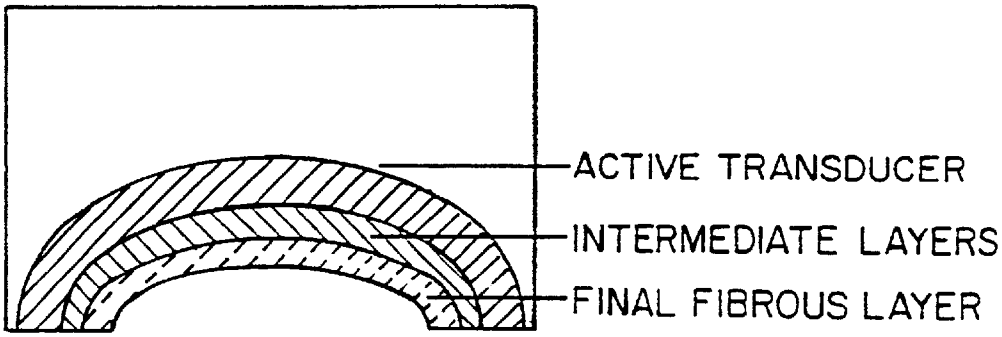
FIG. 7 is a schematic section view of a focussed transducer according to this invention.

Referring to FIG. 7, there is shown a transducer according to an alternate embodiment of this invention that is especially suitable for transmitting ultrasound into a gas and wherein the ultrasound is focussed. The active transducer, the intermediate layer and the final fibrous layer are all shaped to focus the ultrasound at a distance spaced from the transducer. For example, each element of the surface of a layer or the interface between layers is perpendicular to the ultrasound emitted from that material direct to the focal point.

Having thus defined my invention with the detail and particularity required by the Patent Laws, what is desired protected by Letters Patent is set forth in the following claims.

I claim:

1. An ultrasonic transducer for transmitting and receiving ultrasonic energy to and from a gaseous medium comprising:

a piezoelectric element having front and back sides;

an electrically conductive layer bonded to each of the front and back sides of the piezoelectric element;

a transmission layer of lower acoustic impedence materials abutting the layer bonded to front side;

a facing layer of a fibrous material bonded to the transmission layer without substantial penetration of the bonding agent; and electrical connections for applying an exciting electrical signal to the electrically conductive layers of the piezoelectric element.

2. The ultrasonic transducer according to claim 1, wherein the transmission layer of lower acoustic impedance comprises materials selected from the group consisting of polymers, low density metals, ceramics and glass.

3. The ultrasonic transducer according to claim 2, wherein the fibrous material is comprised of fibers, the substantial portion of which are oblique or perpendicular to the front side of the piezoelectric element.

4. A method for transmitting sound or ultrasound through a gaseous medium into a solid specimen comprising the steps of:

bonding a facing layer of a fibrous material to a transmission surface of a transducer for generating sound or ultrasound vibrations without substantial penentration of the bonding agent into the fibrous material; and exciting the transducer directed at a surface of the solid specimen with the facing layer bonded thereto.

5. A method according to claim 4, further comprising the step of bonding, a facing layer of a fibrous material to the surface of the solid specimen without substantial penetration of the bonding agent into the fibrous material.

6. A method for transmitting sound or ultrasound through a gaseous medium into and through a solid specimen comprising the steps of:

bonding a facing layer of a fibrous material to a transmission surface of a first transducer and a second transducer without substantial penetration of the bonding agent into the fibrous material;

bonding a facing layer of a fibrous material to each of opposite surfaces of the solid specimen without substantial penetration of the bonding agent into the fibrous material; and exciting the first transducer directed at one of the opposite surfaces of the solid specimen with the facing layer bonded thereto and detecting the ultrasound transmitted through the solid specimen, and the second facing layer bonded thereto with the second transducer.

* * * * *